United States Patent Office 3,336,402
Patented Aug. 15, 1967

3,336,402
PRODUCTION OF TRIS(CHLORO-
METHYL)MESITYLENE
John L. Tveten, Baytown, Tex., assignor to Esso Research
and Engineering Company
No Drawing. Filed Feb. 7, 1966, Ser. No. 525,371
4 Claims. (Cl. 260—651)

The present invention is directed to the production of tris(chloromethyl)mesitylene. More particularly, the invention is concerned with a two-step process for producing tris(chloromethyl)mesitylene. In its more specific aspects, the invention is concerned with the production of high purity tris(chloromethyl)mesitylene in high conversions.

In the practice of the present invention, mesitylene is heated with an excess of concentrated hydrochloric acid and paraformaldehyde under reflux temperature at atmospheric pressure in the presence of sodium chloride for at least two hours. The resulting reaction product is cooled to form an aqueous phase and a solid phase. The aqueous phase is removed, and an excess of concentrated hydrochloric acid and paraformaldehyde is added to the solid phase along with sodium chloride and zinc chloride. The solid phase containing the added hydrochloric acid and paraformaldehyde is heated under reflux at atmospheric pressure for about 18 to about 36 hours to form high purity, high conversion of tris(chloromethyl)mesitylene, which is then recovered.

The tris(chloromethyl)mesitylene may be purified by crystallization, which may involve solution in a solvent such as benzene, water washing, and evaporation to remove solvent. Likewise, the tris(chloromethyl)mesitylene may be further purified by solution in, and optionally recrystallization from, acetone and the like. Other solvents besides benzene and acetone may be used, such as, but not limited to iso-octane, cyclohexane, and the like. Benzene and acetone are preferred, however, since large quantities of other solvents may be required.

While it may be preferred to recover and purify the tris(chloromethyl)mesitylene, it is contemplated that the high-purity product may be recovered simply by filtration of the final product. Water washing is usually desirable to remove traces of zinc chloride which may cause slow decomposition of the product.

The aqueous phase may be fortified by adding an excess of concentrated hydrochloric acid and paraformaldehyde to it and the so-fortified aqueous phase recycled and admixed with mesitylene for further reaction.

The mesitylene may be heated under reflux for at least two hours. This refluxing operation may be conducted for a period of time from about 2 to about 10 hours. Refluxing for 6 hours gives good results.

The present invention is quite important and useful in that high conversions of high purity tris(chloromethyl)mesitylene or obtainable. The tris(chloromethyl)mesitylene is a well-known chemical which is useful as a chemical intermediate in preparing other chemicals. Heretofore, it has been very difficult, if not impractical, to form this material in high purity because of the difficulty of separating it from bis(chloromethyl)mesitylene. Also, heretofore tris(chloromethyl)mesitylene has been produced by use of high pressures which is unnecessary in the present invention.

The invention will be further illustrated by the following example in which the best mode contemplated is set forth.

To 78 moles of concentrated hydrochloric acid, 54 moles of paraformaldehyde, and 4.8 moles of sodium chloride were added 9 moles of 99.7% purity mesitylene in a reaction zone equipped for stirring. The reaction mixture was heated to a temperature of 108° C. under reflux at atmospheric pressure for six hours while stirring the reactants vigorously, refluxing beginning at about 100° C. After this period of time, the reaction product was cooled and an organic phase solidified and separated from an aqueous phase. The latter was withdrawn, and a fresh charge of an excess of concentrated hydrochloric acid and paraformaldehyde was added along with additional sodium chloride. Zinc chloride (9 moles) was also then added as a catalyst. This latter reaction mixture was heated to a temperature of 108° C. under reflux at atmospheric pressure for 24 hours while vigorously stirring, and then cooled. The resulting solid product was dissolved in benzene and washed with water to remove traces of zinc chloride. Evaporation of the benzene solvent gave a white solid in a yield of 215% by weight, based on the mesitylene charged against the theoretical conversion of 220% by weight. This product was analyzed and found to be 97% by weight tris(chloromethyl)mesitylene. This latter product may be further purified by dissolving it in acetone or other suitable solvent and then recrystallizing it from the solvent.

While the refluxing operation of the second step is preferably conducted for about 24 hours, a lesser or greater time may be used. Thus, the refluxing operation may be conducted over a period of time from about 18 to about 36 hours.

The refluxing temperature in the first heating step may range from about 100° to about 110° C. The refluxing temperature of the second step is from about 100° to about 110° C.

The nature and objects of the present invention having been fully described and illustrated and the best mode contemplated set forth, what I wish to claim as new and useful and secure by Letters Patent is:

1. A two-step method for preparing and recovering high purity tris(chloromethyl)mesitylene at high conversions which comprises:
   heating a mixture consisting of mesitylene, sodium chloride and an excess of concentrated hydrochloric acid and paraformaldehyde under reflux at atmospheric pressure for two to ten hours to form a reaction product;
   cooling said reaction product to form an aqueous phase and a solid organic phase;
   separating said aqueous phase from the solid organic phase;
   heating said solid organic phase containing added hydrochloric acid and paraformaldehyde in the presence of sodium chloride and zinc chloride under reflux at atmospheric pressure for a time within the range of about 18 to about 36 hours to form tris(chloromethyl)mesitylene; and
   recovering said tris(chloromethyl)mesitylene.

2. A method in accordance with claim 1 in which the tris(chloromethyl)mesitylene is purified by crystallization.

3. A method in accordance with claim 2 in which the crystallization includes solution in a solvent, water washing, and evaporation of solvent.

4. A method in accordance with claim 1 in which the tris(chloromethyl)mesitylene is recovered by filtration.

References Cited

UNITED STATES PATENTS 2,966,523   12/1960   Pierri et al. ......... 260—651
2,973,391   2/1961    Earhart et al. ........ 260—651

LEON ZITVER, Primary Examiner.

N. KING, JR., H. T. MARS, Assistant Examiners.